(12) United States Patent
Wilson et al.

(10) Patent No.: US 8,307,307 B2
(45) Date of Patent: Nov. 6, 2012

(54) METHOD FOR PROMPTING USER CONFIRMATION

(75) Inventors: Sean David Drew Wilson, Waterloo (CA); Carl Edward Kilgour Pacey, Kitchener (CA); Patrick Wong, Burnaby (CA)

(73) Assignee: Research In Motion Limited, Waterloo (CA)

( * ) Notice: Subject to any disclaimer, the term of this patent is extended or adjusted under 35 U.S.C. 154(b) by 306 days.

(21) Appl. No.: 11/420,242

(22) Filed: May 25, 2006

(65) Prior Publication Data

US 2007/0277120 A1 Nov. 29, 2007

(51) Int. Cl.
*G06F 3/048* (2006.01)

(52) U.S. Cl. ........ 715/835; 715/808; 715/810; 715/864; 709/206; 709/218; 709/219

(58) Field of Classification Search .................. 715/781, 715/800, 823, 835; 709/206, 218, 219
See application file for complete search history.

(56) References Cited

U.S. PATENT DOCUMENTS

| | | | | |
|---|---|---|---|---|
| 5,333,256 A * | 7/1994 | Green et al. | .................. | 715/772 |
| 5,513,342 A * | 4/1996 | Leong et al. | .................. | 715/798 |
| 5,561,757 A * | 10/1996 | Southgate | .................... | 715/790 |
| 5,900,875 A * | 5/1999 | Haitani et al. | ................. | 715/840 |
| 6,151,507 A * | 11/2000 | Laiho et al. | .................. | 455/466 |
| 6,332,024 B1 * | 12/2001 | Inoue et al. | ............. | 379/433.06 |
| 6,374,277 B2 * | 4/2002 | Vong et al. | .................... | 708/112 |
| 6,463,304 B2 * | 10/2002 | Smethers | ...................... | 455/566 |
| 6,556,841 B2 * | 4/2003 | Yu | ............................... | 455/556.1 |
| 6,865,404 B1 * | 3/2005 | Tikkala et al. | ................ | 455/566 |
| 7,003,327 B1 * | 2/2006 | Payne et al. | .................... | 455/566 |
| 7,190,976 B2 * | 3/2007 | Enns et al. | .................... | 455/566 |
| 7,300,353 B2 * | 11/2007 | Goto et al. | ...................... | 463/42 |
| 7,574,237 B2 * | 8/2009 | Rolnik et al. | ................. | 455/564 |
| 2002/0030699 A1 * | 3/2002 | Van Ee | ........................... | 345/810 |
| 2002/0091775 A1 * | 7/2002 | Morehead et al. | ............ | 709/206 |

(Continued)

FOREIGN PATENT DOCUMENTS

EP 1215580 6/2002

OTHER PUBLICATIONS

Windows Mobile 5.0:Exposed! (1/2), http://pocketnow.com/index.php?a=portal_print&t=reviews&id+601.

(Continued)

*Primary Examiner* — Steven Sax
*Assistant Examiner* — Linh K Pham
(74) *Attorney, Agent, or Firm* — Ridout & Maybee LLP (57) ABSTRACT

Prompting user confirmation of an action in a display window on a display of a mobile electronic device including displaying a pair of soft key icons, receiving a request to initiate an action from a user and displaying a confirmation message to confirm that a user wishes to proceed with the action. When the confirmation message is displayed, the pair of soft key icons are modified to create a pair of updated soft key icons. The receiving of the request may include detection of a soft key event. The updated soft key icons provide a first response and a second response to the confirmation message for selection by the user. The soft key icons and updated soft key icons may be displayed at the bottom portion of the display in a manner that does not obstruct the display window.

19 Claims, 6 Drawing Sheets

U.S. PATENT DOCUMENTS

| | | | |
|---|---|---|---|
| 2002/0107791 A1* | 8/2002 | Nobrega et al. | 705/39 |
| 2002/0137544 A1* | 9/2002 | Myojo | 455/557 |
| 2003/0017844 A1* | 1/2003 | Yu | 455/556 |
| 2003/0040327 A1 | 2/2003 | Park | |
| 2003/0040340 A1* | 2/2003 | Smethers | 455/566 |
| 2003/0067489 A1* | 4/2003 | Candy Wong et al. | 345/765 |
| 2004/0051726 A1* | 3/2004 | Martyn | 345/700 |
| 2004/0100511 A1 | 5/2004 | Wong et al. | |
| 2004/0119754 A1 | 6/2004 | Bangalore et al. | |
| 2004/0141011 A1* | 7/2004 | Smethers et al. | 345/810 |
| 2005/0054286 A1* | 3/2005 | Kanjilal et al. | 455/3.05 |
| 2005/0102584 A1* | 5/2005 | Paturi et al. | 714/47 |
| 2005/0197141 A1* | 9/2005 | Jiang et al. | 455/457 |
| 2005/0278794 A1* | 12/2005 | Leinonen et al. | 726/32 |
| 2006/0031784 A1* | 2/2006 | Makela | 715/850 |
| 2006/0036968 A1* | 2/2006 | Pradhan et al. | 715/800 |
| 2006/0107227 A1* | 5/2006 | Kiljander | 715/772 |
| 2006/0123360 A1* | 6/2006 | Anwar et al. | 715/810 |
| 2006/0150104 A1* | 7/2006 | Lira | 715/733 |
| 2006/0154642 A1* | 7/2006 | Scannell | 455/404.1 |
| 2006/0212906 A1* | 9/2006 | Cantalini | 725/62 |
| 2007/0006093 A1* | 1/2007 | Day et al. | 715/781 |
| 2007/0277117 A1* | 11/2007 | Wilson et al. | 715/777 |
| 2009/0048870 A1* | 2/2009 | Godshall et al. | 705/3 |

OTHER PUBLICATIONS

Review—Microsoft Windows Mobile 5.0, http://www.bargainpda.com/default.asp?newsID=2668.

How to:Overrride Smartphone Soft Keys, http://msdn2.microsoft.com/en-us/library(d=printer)ms229651.aspx.

WindowsForDevices.com, http://www.windowsfordevices.com/articles/AT4228820897.html.

* cited by examiner

PRIOR ART

METHOD FOR PROMPTING USER CONFIRMATION

FIELD OF TECHNOLOGY

The present application relates to applications operating upon mobile devices and, in particular, prompting user confirmation of actions.

BACKGROUND INFORMATION

Figure 1:
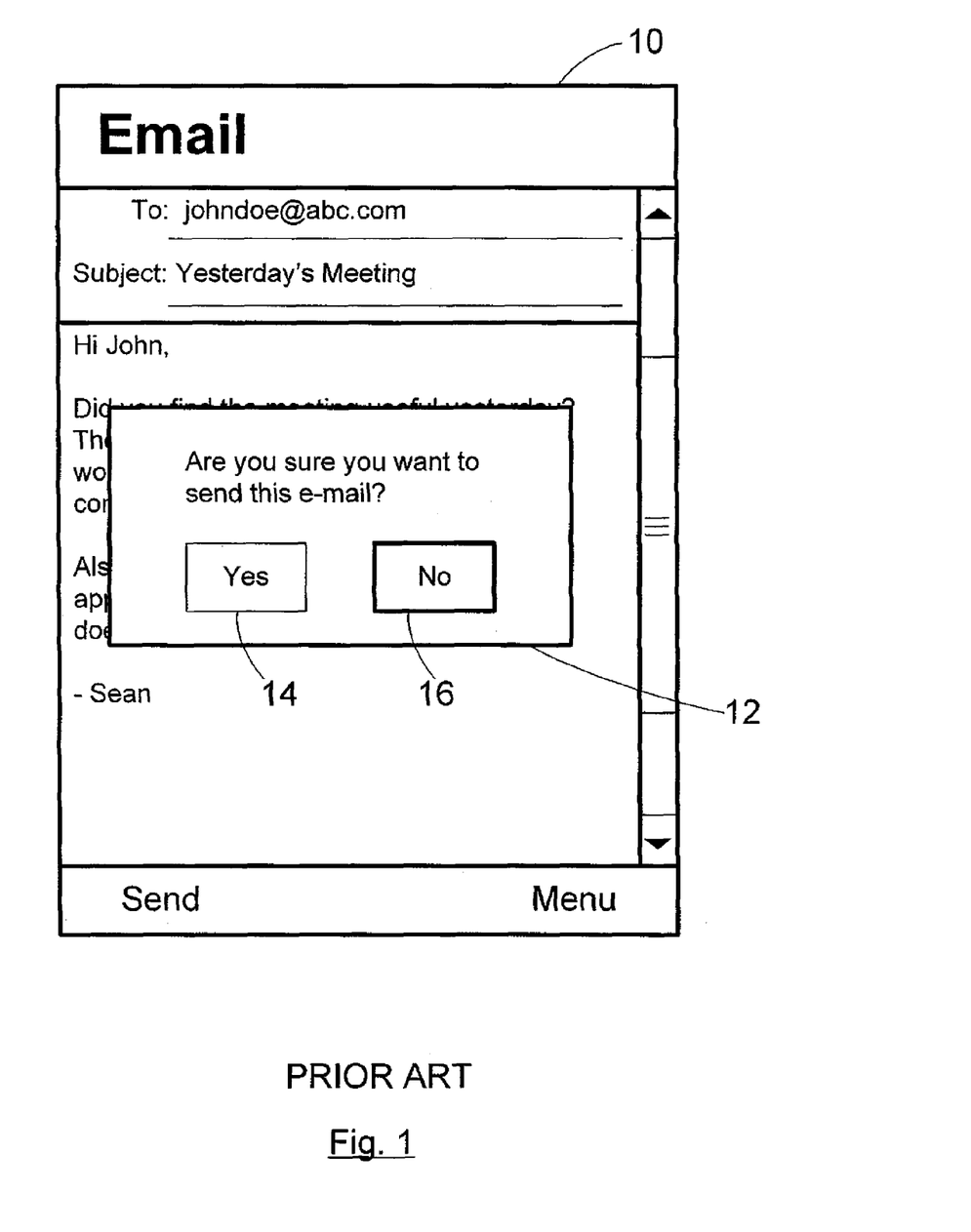
FIG. 1 illustrates a screenshot of a prior art user confirmation prompt.

When a user executes certain actions in a display window of a mobile device, a message box with text and on-screen input buttons appears on top of the main display screen to confirm that the user wishes to proceed with that action. This message box covers at least part of the main display screen thus preventing the user from seeing or interacting with it without cancelling the action. An example screenshot of an e-mail window 10 is illustrated in FIG. 1. A confirmation message box 12 having a 'Yes' input button 14 and a 'No' input button 16 covers the e-mail window 10. This can be problematic if, for example, the user wishes to review the e-mail message they have composed one last time before sending it out.

Selection of the on-screen input buttons (e.g. 'Yes' input button 14 and 'No' input button 16) must be accomplished by tapping the desired on-screen input button with the stylus, selecting the appropriate 'action' hardware button (e.g. the send button) or navigating from a current active element of the display to the desired one of the input buttons 14 and 16 using, for example, a directional pad. The user often needs to use both hands to accomplish this task as opposed to working directly with the user interface of the mobile device, which can be done with one hand.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION

The present application describes methods, devices and computer program products for prompting user confirmation of an action using soft keys and displaying a confirmation message and two or more soft key icons. Where the action itself has been initiated using the same soft keys, the user will not have to move to another hardware button or pick up the stylus to confirm the action. The confirmation message and soft key icons may be displayed below the main display window so that the main display window is not concealed. The main display window may be reduced in size to accommodate the confirmation message and the soft key icons.

In one aspect, the present application provides a method for prompting user confirmation of a requested action on a display of a mobile electronic device. The method comprises the steps of displaying at least two soft key icons, receiving a request to initiate an action from a user, displaying a confirmation message to confirm that the user wishes to proceed with the action, and modifying the at least two soft key icons to display at least two updated soft key icons. The at least two updated soft key icons provide a first response and a second response to the confirmation message for selection by the user.

In another aspect, the present application provides a mobile electronic device. The device comprises a display for displaying a display window and at least two soft key icons, a user input device for requesting initiation of an action, an operating system for detecting the request, and a confirmation module responsive to detection of the request. The confirmation module includes components for (i) instructing the display to display a confirmation message to confirm that a user wishes to proceed with the action; and (ii) modifying the at least two soft key icons to create at least two updated soft key icons in association with the confirmation message. The at least two updated soft key icons provide a first response and a second response to the confirmation message for selection by the user.

In yet another aspect, the present application provides a computer program product having a computer-readable medium tangibly embodying computer executable instructions for prompting user confirmation of an action in a display window on a display of a mobile electronic device. The instructions comprise instructions for displaying at least two soft key icons, instructions for receiving a request to initiate an action from a user, instructions for displaying a confirmation message to confirm that a user wishes to proceed with the action, and instructions for modifying the at least two soft key icons to create at least two updated soft key icons. The at least two updated soft key icons provide a first response and a second response to the confirmation message for selection by the user.

In yet another aspect, the present application provides a method for displaying a user confirmation message for prompting user confirmation of a requested action on a display of a mobile electronic device. The method comprises the steps of displaying a display window, receiving a request to initiate an action from a user, displaying a confirmation message to confirm that the user wishes to proceed with the action, and resizing the display window to accommodate the confirmation message. The confirmation message is displayed below the display window so that the display window is not concealed by the confirmation message.

Other aspects and features of the present application will be apparent to one of ordinary skill in the art in light of the following detailed description and drawings depicting one or more embodiments.

Figure 2:
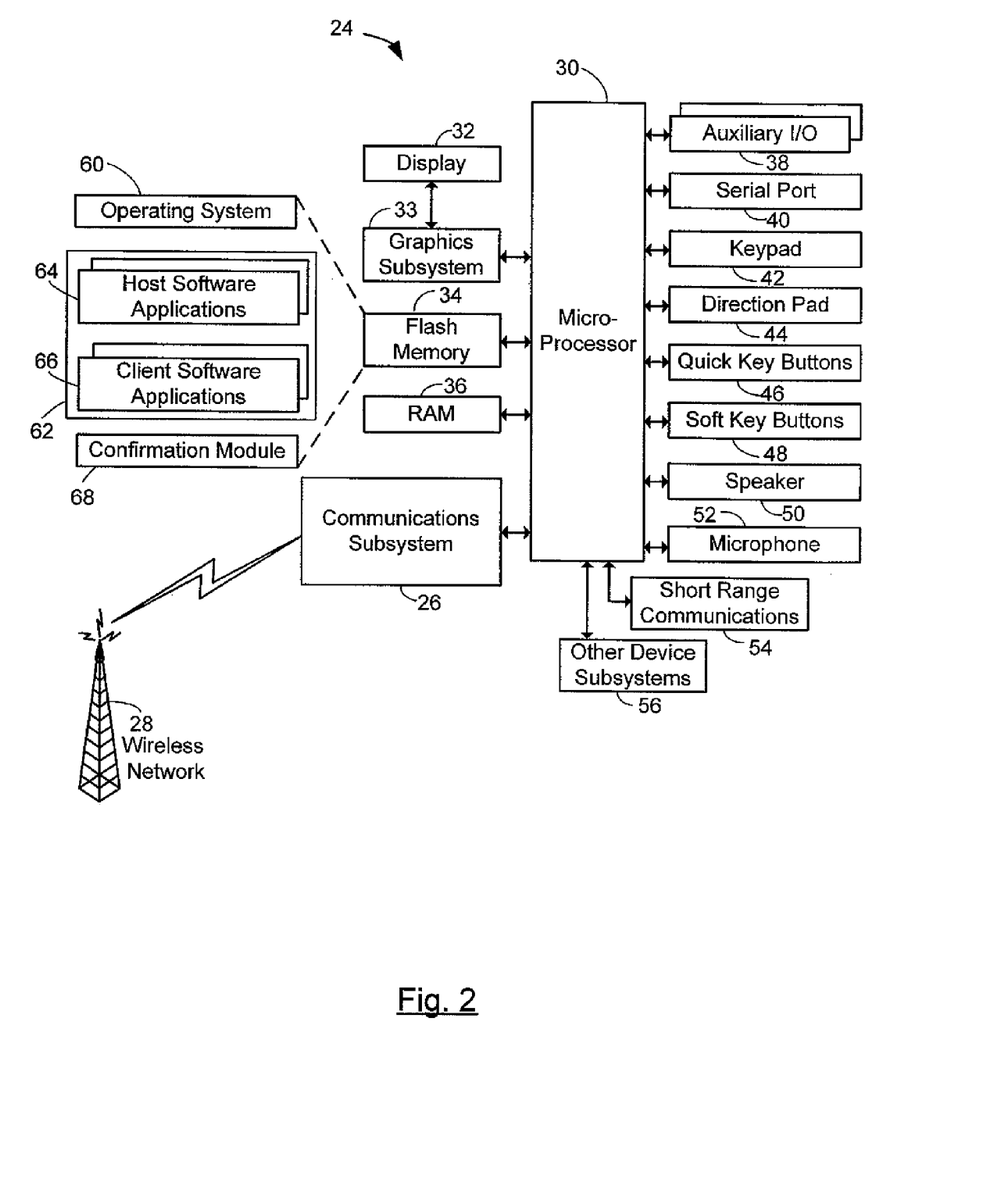
FIG. 2 is a block diagram of an electronic device.

FIG. 2 shows a block diagram of an electronic device 24 to which example embodiments described herein may be applied. The electronic device 24 may comprise a communications subsystem 26 which communicates with a wireless network 28. The particular design of the communication subsystem 26 will be dependent upon the communication network in which the electronic device 24 is intended to operate.

The electronic device 24 may be a hand-held mobile electronic device 24 having at least one of data communication capabilities, voice communication capabilities and capabilities for communicating with other computer systems on the Internet. In various embodiments, electronic device 24 may be a data communication device, a multiple-mode communication device configured for both data and voice communication, a mobile telephone, a mobile communication device, a PDA enabled for wireless communications, a 1-way or 2-way pager and any type of mobile wireless communication device. It should be appreciated however that the present application is in no way limited to these example types of devices and may be implemented in other devices. Example embodiments may also be applied to non-wireless enabled devices.

The electronic device 24 includes a microprocessor 30 that controls the overall operation of the electronic device 24. The microprocessor 30 interacts with communications subsystem 26 and also interacts with further device subsystems such as the display 32 and graphics subsystems 33, flash memory 34, random access memory (RAM) 36, auxiliary input/output (I/O) subsystems 38 (which may include a stylus, for example), serial port 40, a keypad or keyboard 42, directional pad 44, quick key buttons 46, soft key buttons 48, speaker 50, microphone 52, a short-range communications subsystem 54, and any other device subsystems generally designated as 56. Of course, any combination of the above listed device subsystems may be used.

Some of the subsystems shown in FIG. 2 perform communication-related functions, whereas other subsystems may provide "resident" or on-device functions. Notably, some subsystems, such as display 32, keypad or keyboard 42, directional pad 44, quick key buttons 46 and soft key buttons 48 for example, may be used for both communication-related functions, such as entering a text message for transmission over a communication network, and device-resident functions such as a calculator or task list.

Operating system software 60 (such as, for example, the operating system Windows Mobile™ marketed by the Microsoft Corporation) and various software applications 62 used by the microprocessor 30 are, in one example embodiment, stored in a persistent store such as flash memory 34 or similar storage element. Software applications 62 may include a wide range of applications, including a text messaging application, a ring tone application, a contacts application, and/or a game application. Those skilled in the art will appreciate that the operating system 60 and software applications 62, or parts thereof, may be temporarily loaded into a volatile store such as RAM 36.

The microprocessor 30, in addition to its operating system functions, enables execution of software applications 62. The software applications 62 may include host software applications 64 and client software applications 66 on the device. Host software applications 64 will typically include a predetermined set of applications which control basic device operations and will normally be installed on the electronic device 24 during manufacture.

One of the client applications 66 may be, for example, a wireless data communication application. The wireless data communication application may, for example, enable the receipt and transmission of electronic messages. In one embodiment, the wireless data communication application may provide for electronic messaging, i.e. E-mail, that is synchronised and co-ordinated with a remote electronic messaging server. Electronic messaging functions provided by the wireless data communication application may include composing messages, saving messages, and displaying messages. Other functions or features may include a contacts list or directory, a calendar application, a task list application, a web browser, and other modules or applications.

Each of the client applications 66 may be a self-contained stand-alone entity that may have been designed to operate upon a specific 'native' device. Each client application 66 is typically created and developed by a separate entity than the remainder of the electronic device 24. The client application 66 may be associated with a native environment or device in association with which it was originally developed. Accordingly, the client application 66 may include the functions and features associated with its operation on its native device, but packaged as a stand-alone software entity designed to run on top of a third-party platform in a third-party device.

Alternatively, the client applications 66 may be self-contained stand-alone entities that may have been designed to operate on a specific host device with a specific operating system. Such a client application 66 may still have been created and developed by a separate entity than the remainder of electronic device 24. Accordingly, such a client application 66 may include functions and features associated with known operation of the host device, but packaged as a stand-alone software entity.

Of course, further software applications 62 may also be loaded onto the electronic device 24 through the wireless network 28, an auxiliary I/O subsystem 38, serial port 40, short-range communications subsystem 54 or any other suitable subsystem 56, and installed by a user in the RAM 36 or a non-volatile store for execution by the microprocessor 30. Such flexibility in application installation increases the functionality of the electronic device 24 and may provide enhanced on-device functions, communication-related functions, or both.

The electronic device 24 also includes a confirmation module 68. The confirmation module 68 prompts user confirmation of an action using soft keys and displays a confirmation message and two or more soft key icons. The confirmation module 68 is responsive to the soft key buttons 48 to provide one-touch confirmation of an action irrespective of which element in the display 32 is the active element. Although the confirmation module 68 is referred to as a "module" it will be appreciated that the functions of the confirmation module 68 may be implemented through a variety of programming constructs, which in some embodiments may include subroutines, application programs, objects, or portions or combinations thereof. The use of the terms "module", "component", "object", or other such elements, to refer to software program elements should be considered as encompassing all such elements as would be suitable in the circumstances, having regard to the programming environment, as will be understood by persons of ordinary skill in the art. It will also be appreciated that, although the confirmation module 68 is shown separately for ease of illustration in FIG. 2, it may form a part of the operating system 60 and/or one or more software applications 62.

Figure 3:
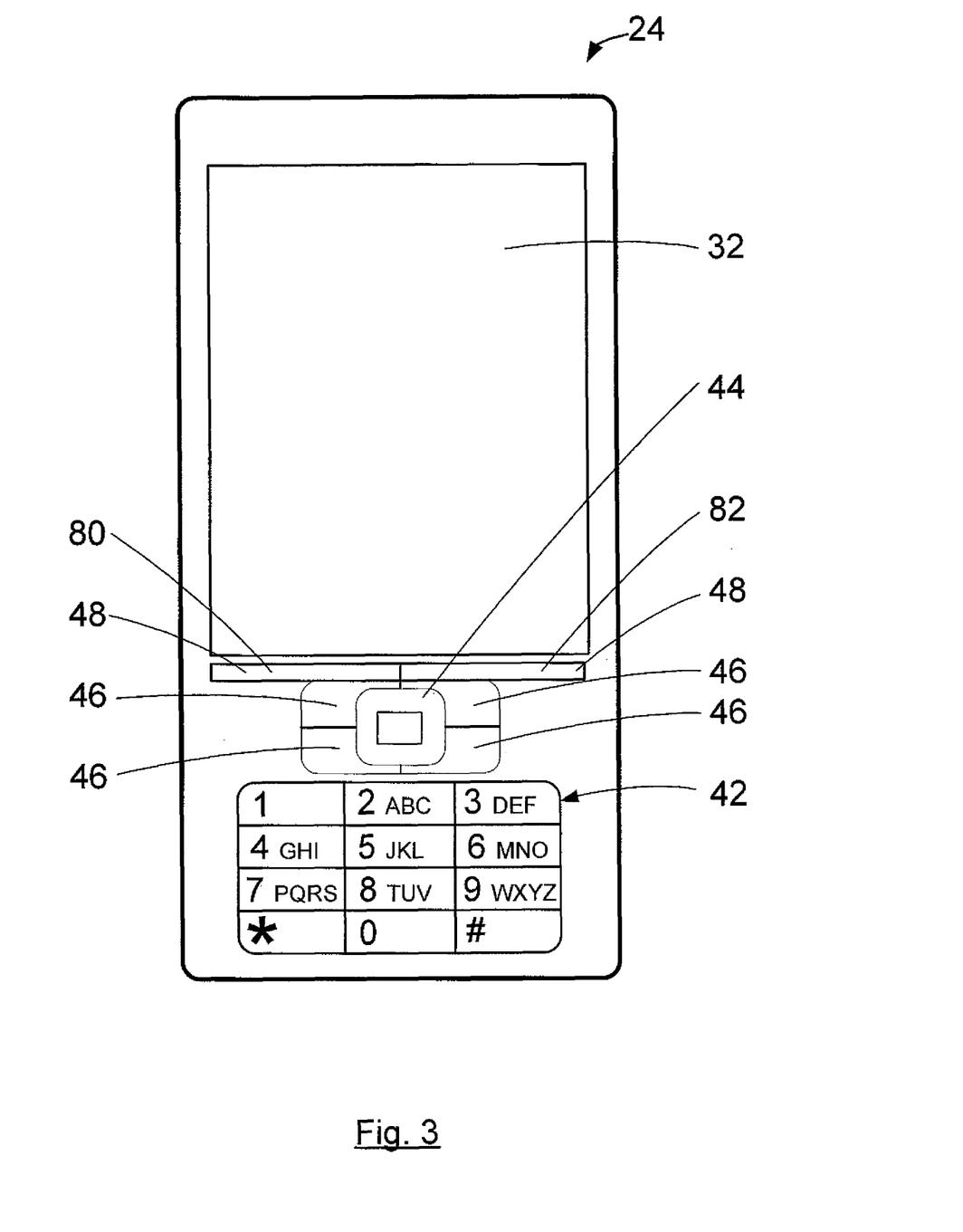
FIG. 3 diagrammatically shows the electronic device of FIG. 1.

Reference is now made to FIG. 3, which diagrammatically shows a front view of the electronic device 24 of FIG. 2. As mentioned previously, the electronic device 24 may be provided with soft key buttons 48. Soft key buttons 48 may include a left soft key button 80 and a right soft key button 82. The soft key buttons 48 are multi-function buttons whose active function is context-dependent. The function of the soft key buttons 48 in a given context is typically indicated on the display 32 in the vicinity of the soft key buttons 48. The function of the soft key buttons 48 may be dependent upon the window being displayed on the display 32 or the software application 62 active on the display 32.

Figure 4:
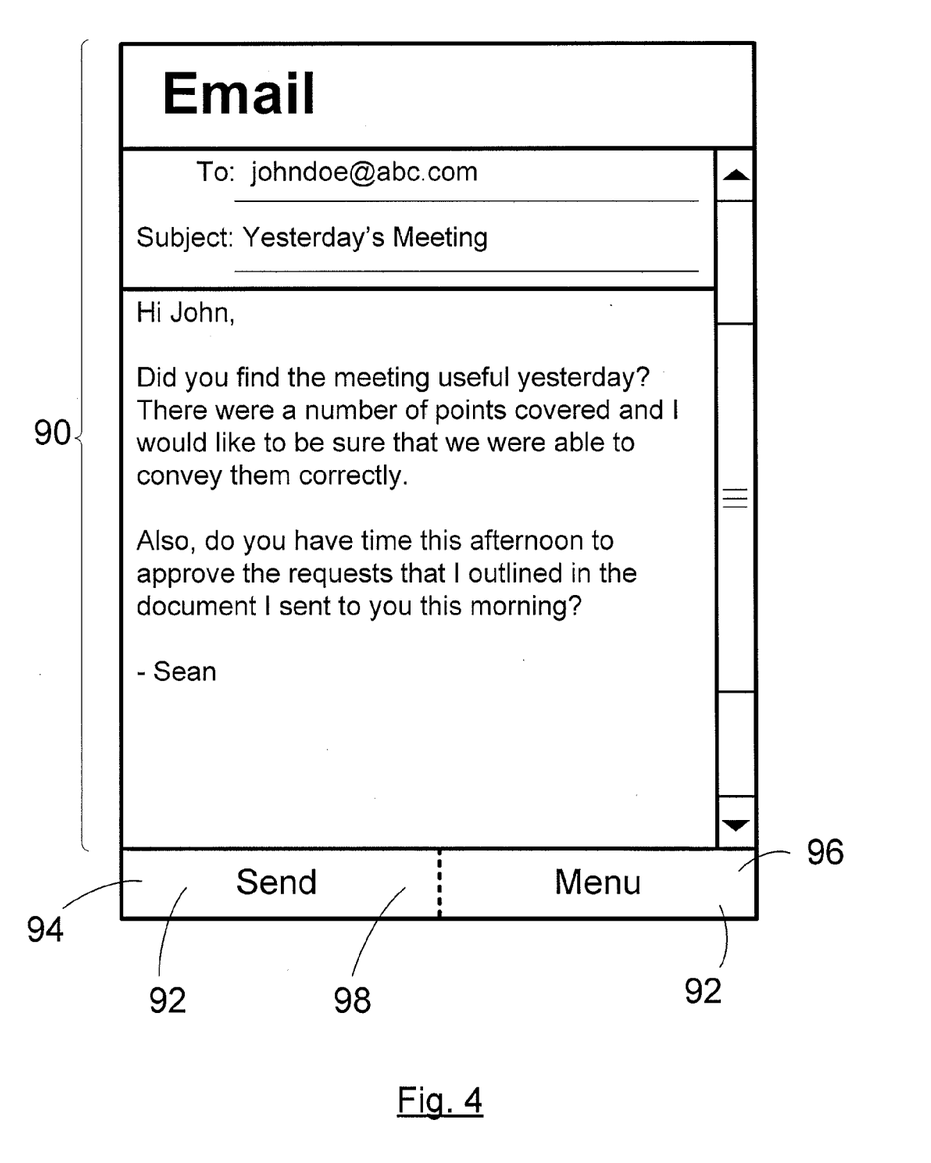
FIG. 4 illustrates a screenshot of an e-mail composition window.

Reference is now also made to FIG. 4, which illustrates a screenshot of a display window which is rendered on the display 32 of the electronic device 24 for an active one of the applications 62. In this example embodiment, the display window is an e-mail composition window 90 and the active application is a wireless data communication application. The soft key buttons 48 in this example embodiment may be associated with soft key icons 92 on the display 32. The soft key icons 92 may indicate the function of the soft key buttons 48 in a given context, as mentioned previously, and are typically displayed in the vicinity of the soft key buttons 48, as shown. Soft key icons 92 may include left soft key icon 94 (associated with left soft key button 80) and right soft key icon 96 (associated with right soft key button 82). Each icon corresponds to an action. For example, the left soft key icon 94 may correspond to the 'Send' action and the right soft key icon 96 may correspond to the 'Menu' action, as shown. The soft key icons 92 may be arranged as a soft key bar 98, as shown, or as two separate icons (as indicated by the dashed line in FIG. 4). Of course, in some example embodiments the electronic device 24 may be provided with soft key icons 92 on the display 32 without soft key buttons 48. The soft key buttons 48 may not be physically labelled.

The operating system 60 may associate the soft key buttons 48 and their corresponding soft key icons 92 with soft key handles, such that when the operating system 60 recognizes activation of one of the soft key buttons 48 or soft key icons 92, the corresponding soft key handle is referenced for handling the soft key event. These soft key handles may prescribe various actions. In typical usage, one soft key handle may be assigned to a single action (e.g. sending an e-mail message) and the other one of the soft key handles may be assigned to open a menu of actions. The operating system 60 may further provide a facility for changing the command or action assigned to a given soft key handle. This may allow an application developer to customize operation of the soft key buttons 48 to the particular application 62 running on the electronic device 24.

Figure 5:
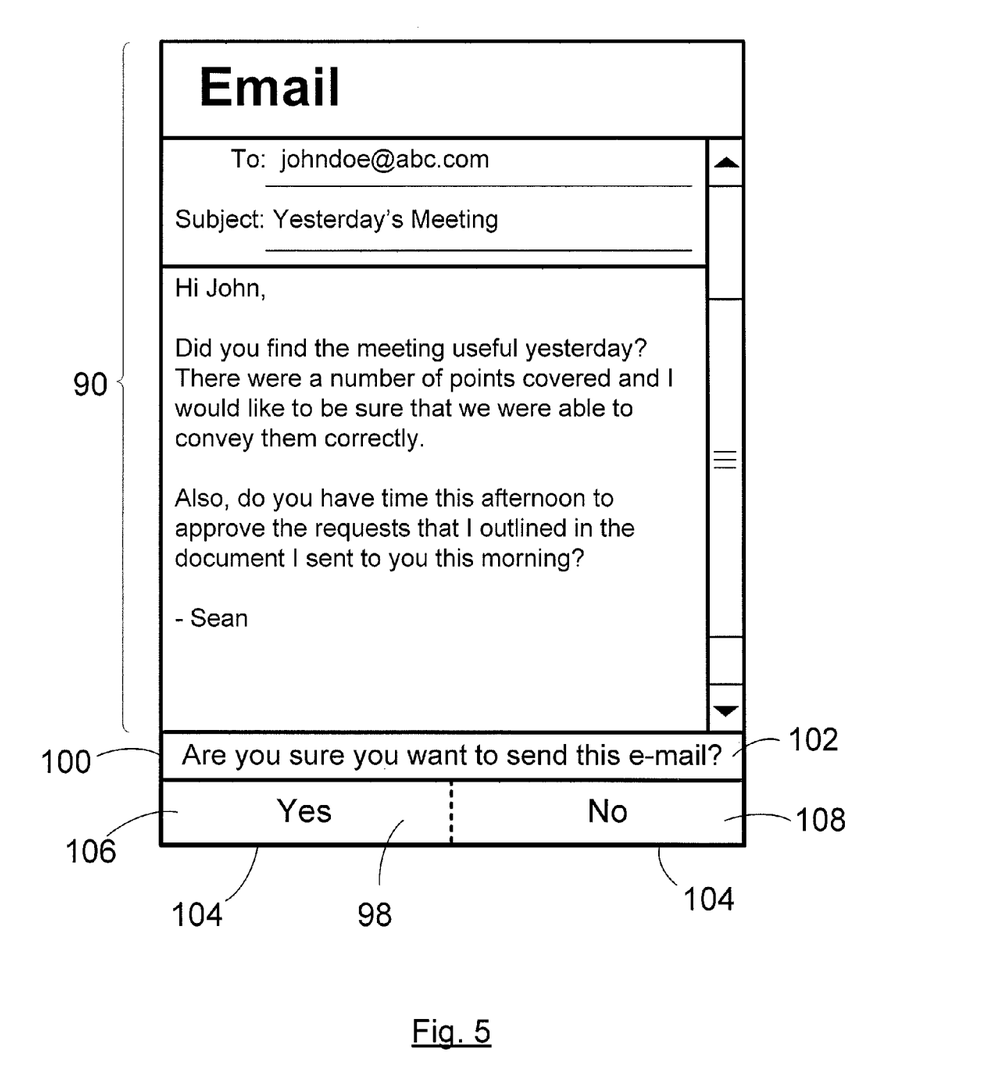
FIG. 5 illustrates a screenshot of an e-mail composition window displaying a user confirmation message.

Various software applications 62 installed on the electronic device 24 may involve prompting user confirmation of an action. In the example embodiment illustrated in FIG. 4, a user may use one of the soft key buttons 48, such as the left soft key button 80, to send the e-mail message when they have composed an e-mail message in the e-mail composition window 90. FIG. 5 illustrates a screenshot of the e-mail composition window 90 of FIG. 4 after the user has initiated sending of the e-mail message by, for example, pressing the left soft key button 80 which is associated with the left soft key icon 94 ('Send'). Of course, sending of the e-mail message may be initiated by other user input means such as the auxiliary I/O subsystems 38 (which may include a stylus, for example).

The operating system 60 (FIG. 2) recognizes the occurrence of a request to initiate an action requiring user confirmation. The operating system 60 then informs the confirmation module 68 of the occurrence of the request. In this example embodiment, the request may take the form of or be initiated by a soft key event such as a 'Send' soft key event. The 'Send' soft key event may be triggered by pressing the left soft key button 80, as mentioned previously, or by user selection of the corresponding soft key icon 92, in this example the left soft key icon 94 via, for example, the auxiliary I/O subsystems 38 (which may include a stylus, for example). The operating system 60, in particular the soft key handle corresponding to the 'Send' soft key event, informs the confirmation module 68 of the occurrence of the request.

The confirmation module 68 then creates a confirmation bar 100 which displays a confirmation message 102. In this example, the confirmation message 102 is "Are you sure you want to send this e-mail?". The confirmation module 68 may also update the soft key icons to create updated soft key icons 104 by changing the text of the soft key icons 92 to present text associated with the confirmation message 102. The updated soft key icons 104 provide the user with a first response and a second response to the confirmation message 102. In this example embodiment, the text of the left updated soft key icon 106 is changed from "Send" to "Yes" (the first response) and the text of the right updated soft key icon 108 is changed from "Menu" to "No" (the second response).

While the confirmation message 102 is displayed, the user may optionally perform various actions in the display 32. In this example, the user may optionally edit the e-mail message further.

The confirmation bar 100 and confirmation message 102 may be of the same colour and/or font style as the soft key icons 104 and 106 and/or other display elements. In one embodiment the confirmation module 68 is implemented in a Windows Mobile™ system, and the confirmation bar 100 comprises a windows message box.

Where the confirmation module 68 also updates the soft key icons to create updated soft key icons 104, the user may select one of the first response and the second response to the confirmation message 102. For example, the user may confirm the action by selecting the first response, namely the updated soft key icon associated with confirmation. In this example embodiment, the user would confirm that they want to send the e-mail message by pressing the left soft key button 80 which is associated with the left updated soft key icon 106 ('Yes'). The operating system 60 (FIG. 2) recognizes the occurrence of a soft key event, here the 'Yes' (confirmation) soft key event.

Alternatively, if the user does not wish to confirm the action, but would rather abandon the action, the user may select the second response, namely the right soft key button 82 which is associated with the right updated soft key icon 108 ('No'). The operating system 60 (FIG. 2) recognizes the occurrence of a soft key event, here the 'No' (abandonment) soft key event.

Of course, confirmation and abandonment soft key events may be initiated by user selection of one of the updated soft key icons 104, in this example the left soft key icon 106 or right soft key icon 108 via, for example, the auxiliary I/O subsystems 38 (which may include a stylus, for example).

While in the above description the updated left soft key icon 106 and corresponding left soft key button 80 are associated with confirmation of an action and updated right soft key icon 108 and the corresponding right soft key button 82 are associated with abandonment of an action, these assignments may be reversed. Similarly, the text displayed may be any suitable text.

If the user has elected to confirm the action, the confirmation module 68 proceeds with that action. In the present example, the confirmation module 68 saves the e-mail message that has been composed, removes the confirmation bar 100, closes the e-mail composition window 90 and performs the requested action, namely sending the e-mail message. If the user has elected to abandon the action, the confirmation module 68 simply removes the confirmation bar 100 and displays the e-mail composition window 90, as shown in FIG. 4. Of course, at least the saving of the e-mail message and sending of the e-mail message may be performed by a separate e-mail application, such as the wireless data communication application mentioned previously. The confirmation module 68 may be built into that e-mail application.

When the confirmation bar 100 is displayed, the display window (in the present example, the e-mail composition window 90) may be resized to accommodate the confirmation bar 100. The resizing may be accomplished by upwardly displacing the bottom border of the display window 90.

Figure 6:
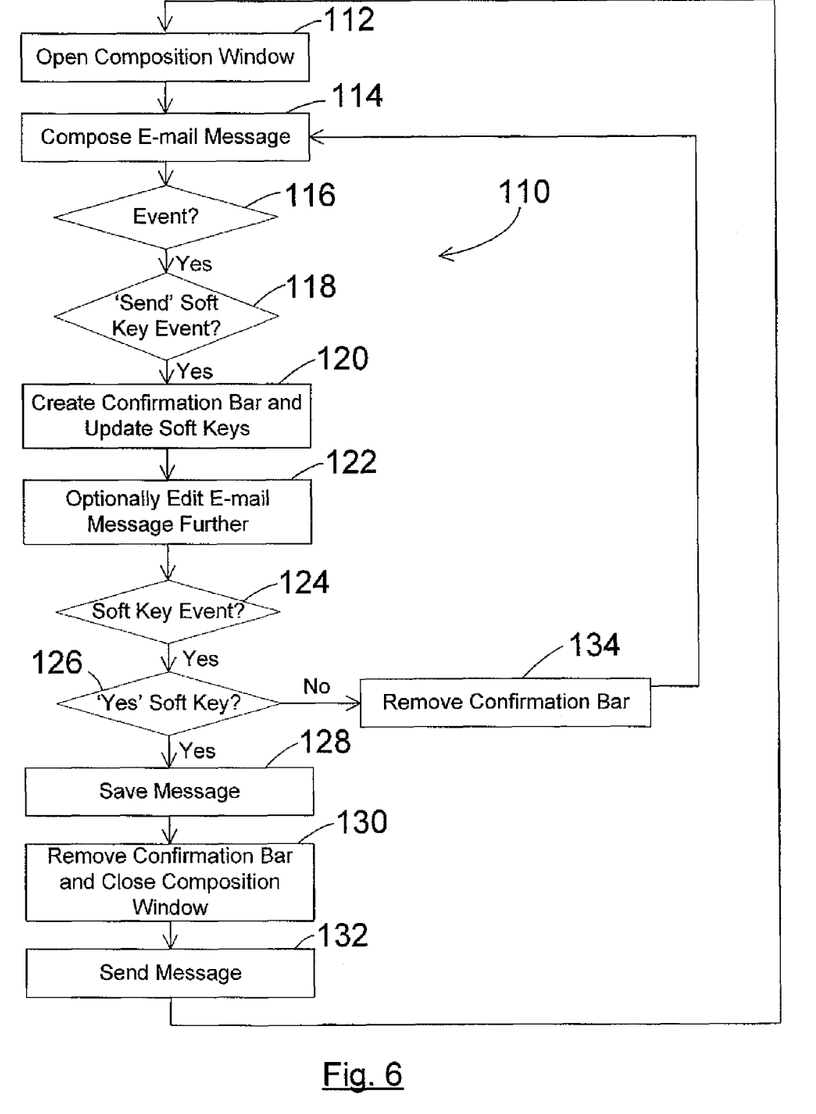
FIG. 6 shows, in flowchart form, a method for prompting user confirmation of an action.

Reference is now made to FIG. 6, which shows, in flowchart form, a method 110 for prompting user confirmation of an action in a display window on the display 32. Specifically, the method 110 relates to the previously described example embodiment of prompting of user confirmation of the 'send' action in an e-mail composition window 90. The method 110 comprises opening an e-mail composition window or form (step 112) and composing an e-mail message (step 114). A pair of soft key icons 92 are displayed in a bottom portion of the e-mail composition window 90. The soft key icons 92 include a left soft key icon 94 labelled with the text "Send" and a right soft key icon 96 labelled with the text "Menu". Upon detection of a soft key event associated with one of the pair of soft key icons 92 (step 116), the operating system determines a soft key identifier of the soft key event. Of course, the event need not be a soft key event but could be any event.

The soft key identifier is associated with an action. If the soft key identifier is 'Send' (step 118), then in step 120 the confirmation module 68 creates a confirmation bar 100 (which displays a confirmation message 102 to confirm that a user wishes to proceed with the action) and modifies the pair of soft key icons 92 to create a pair of updated soft key icons 104 which provide the user with a first response and a second response to the confirmation message 102. In this example, the updated soft key icons 104 include a left soft key icon 106 labelled with the text "Yes" and a right soft key icon 108 labelled with the text "No". The confirmation message 102 may be "Are you sure you want to send this e-mail?".

The user may optionally perform further actions within the display window such as, in this example, optionally editing the e-mail message further (step 122).

Upon detection of a further soft key event associated with one of the pair of updated soft key icons 104 (step 124), the operating system determines a soft key identifier of the further soft key event. The soft key identifier is associated with confirmation of the action or abandonment of the action. If the soft key identifier is associated with confirmation of the action (here, the soft key identifier associated with the left soft key icon 106 having the text 'Yes') (step 126), the confirmation module 68 proceeds with the action. In this example, proceeding with the action involves saving the message (step 128), removing the confirmation bar 100 and closing the email composition window (step 130) and sending the e-mail message (step 132). Alternatively, if the soft key identifier is associated with abandonment of the action (here, the soft key identifier associated with the right soft key icon 108 having the text 'No' (step 126)), the confirmation module 68 removes the confirmation bar 100 (step 134). Once step 132 or step 134 is complete, the confirmation module 68 waits for the next soft key event.

While the above described example embodiment relates to confirmation of a 'Send' action in an email composition window, it should be understood that example embodiments may be applied to any suitable display window and any suitable action. For example, when closing an address book entry to which changes have been made, the confirmation message 102 may be "Would you like to save these changes?" and the updated soft key icons 104 may display 'Save' and 'Don't Save'.

It should be understood that any number of soft keys and/or soft key icons may be used.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method for operating a mobile electronic device having an active application for which a main window is displayed on a display, the method comprising the steps of:
   displaying at least two soft key icons;
   assigning an action of the active application to one of the at least two soft key icons:
   receiving a request to initiate the action of the active application from said one soft key icon;
   displaying a new window on the display in response to receiving said request;
   wherein displaying the new window comprises resizing said main window to accommodate said new window in response to receiving said request, and
   wherein the displaying of the new window includes maintaining said main window as a current active element for editing within said main window, including permitting further actions within said main window, wherein the permitted further actions comprise editing text within the main window;
   displaying a confirmation message in said new window to confirm proceeding with said action, wherein said soft key icons are displayed at a bottom portion of said display and said confirmation message is displayed adjacent and above said soft key icons; and
   modifying said at least two soft key icons including said one of the at least two soft key icons to display at least two updated soft key icons, said at least two updated soft key icons providing a first response and a second response to said confirmation message for selection by the user, wherein said first response is associated with confirmation of said action and said second response is associated with abandonment of said action.

2. The method according to claim 1, wherein said step of receiving includes detecting a soft key event associated with said one of the at least two soft key icons and determining a soft key identifier associated with said one of the at least two soft key icons.

3. The method according to claim 1, wherein said active application comprises a wireless data communication application, and wherein said action comprises a send message action.

4. The method according to claim 3 wherein said editing comprises editing text of a message within the main window.

5. The method according to claim 1, further comprising the step of detecting an updated soft key event associated with one of the at least two updated soft key icons.

6. The method according to claim 5, further comprising the step of, if said updated soft key event is associated with said first response, performing said action, and, if said updated soft key event is associated with said second response, removing said confirmation message from said display.

7. The method according to claim 1, wherein the mobile electronic device includes a hand-held device.

8. A mobile electronic device, comprising:
   a processor for controlling operation of the mobile electronic device;
   a display for displaying a main window and for displaying at least two soft key icons;
   an active application executed by the processor, said active application having said main window displayed on the display;
   a user input device for receiving a request to initiate an action of the active application, wherein said action is assigned to one of the at least two soft key icons; and
   a module executed by the processor responsive to reception of said request, the module including components for instructing said display to display a new window on the display in response to receiving said request, including resizing said main window to accommodate said new window in response to receiving said request, wherein the displaying of the new window includes maintaining said display main window as a current active element for editing within said main window, wherein further actions are permitted within said main window, wherein the permitted further actions comprise editing text within the main window, wherein a confirmation message is displayed in the new window to confirm proceeding with said action, wherein said soft key icons are displayed at a bottom portion of said display and said confirmation message is displayed adjacent and above said soft key icons, and wherein said at least two soft key icons are modified to include said one of the at least two soft key icons to create at least two updated soft key icons in association with said confirmation message, said at least two updated soft key icons providing a first response and a second response to said confirmation message for selection by the user, wherein said first response is associated with confirmation of said action and said second response is associated with abandonment of said action.

9. The mobile electronic device according to claim 8, wherein said user input device comprises soft key buttons and said request comprises a soft key event triggered when a user depresses said soft key buttons.

10. The mobile electronic device according to claim 8, wherein said user input device comprises a stylus and said request comprises a soft key event triggered when a user selects said one of the at least two soft key icons using said stylus.

11. The mobile electronic device according to claim 8, wherein said active application comprises a wireless data communication application, and wherein said action comprises a send message action.

12. The mobile electronic device of claim 11 wherein said editing comprises editing text of a message within the main window.

13. The mobile electronic device according to claim 8, wherein said module further includes a component for detecting an updated soft key event associated with one of the at least two updated soft key icons.

14. The mobile electronic device according to claim 13, wherein said module is adapted to cause said action to be performed if said updated soft key event is associated with said first response.

15. A non-transitory computer-readable medium tangibly embodying computer executable instructions for operating a mobile electronic device, the mobile electronic device having an active application for which a main window is displayed on a display, said instructions comprising:

instructions for displaying at least two soft key icons;

instructions for assigning an action of the active application to one of the at least two soft key icons;

instructions for receiving a request to initiate said action from said one soft key icon;

instructions for displaying a new window on the display in response to receiving said request;

wherein said instructions for displaying the new window include instructions for resizing said main window to accommodate said new window, and wherein the displaying of the new window includes maintaining said main window as a current active element for editing within said main window, including permitting further actions within said main window, wherein the permitted further actions comprise editing text within the main window;

instructions for displaying a confirmation message in said new window to confirm proceeding with said action, wherein said soft key icons are displayed at a bottom portion of said display and said confirmation message is displayed adjacent and above said soft key icons; and instructions for modifying said at least two soft key icons including said one of the at least two soft key icons to display at least two updated soft key icons, said at least two updated soft key icons providing a first response and a second response to said confirmation message for selection by the user, wherein said first response is associated with confirmation of said action and said second response is associated with abandonment of said action.

16. The non-transitory computer-readable medium according to claim 15, wherein said instructions for receiving includes instructions for detecting a soft key event associated with said one of the at least two soft key icons and instructions for determining a soft key identifier associated with said one of the at least two soft key icons.

17. The non-transitory computer-readable medium according to claim 15, wherein said active application comprises a wireless data communication application, and wherein said action comprises a send message action.

18. The non-transitory computer-readable medium according to claim 15, further comprising instructions for detecting an updated soft key event associated with one of the at least two updated soft key icons.

19. The non-transitory computer-readable medium according to claim 15, further comprising instructions for, if said updated soft key event is associated with said first response, performing said action, and, if said updated soft key event is associated with said second response, removing said confirmation message from said display.

* * * * *